Dec. 8, 1964
K. K. KELLEMS
3,159,866
VERTICALLY ADJUSTABLE SLIDING DOOR HANGER
Filed May 31, 1962
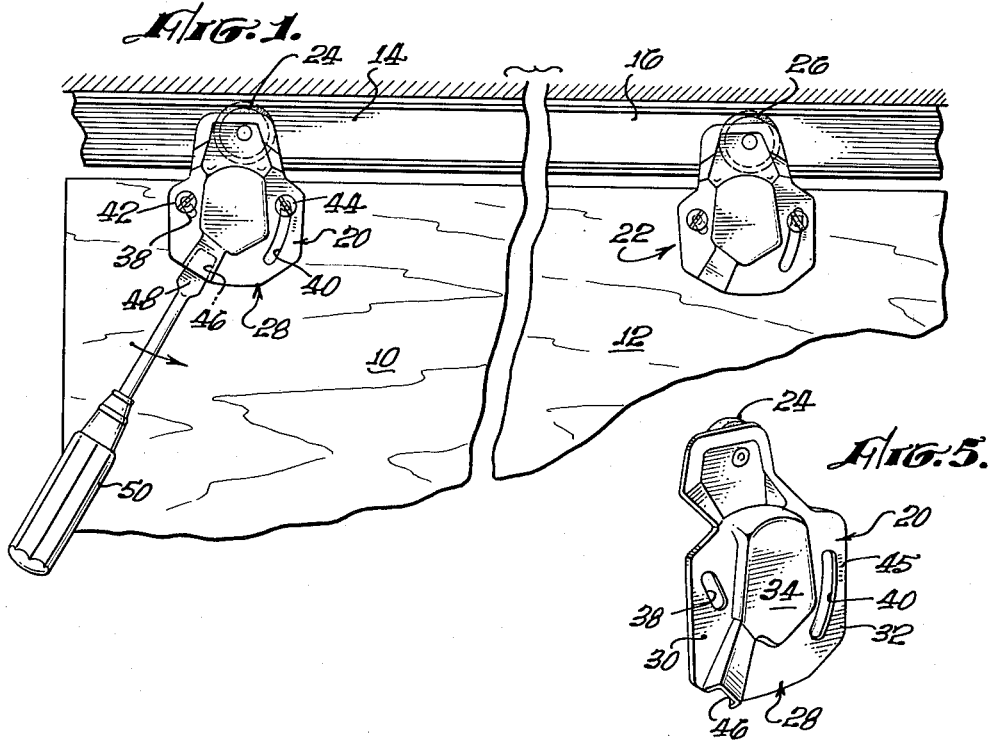
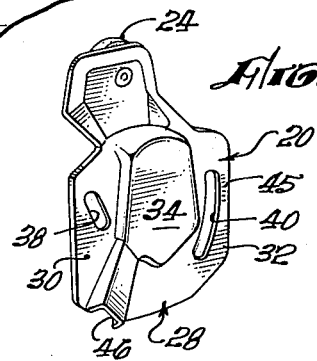
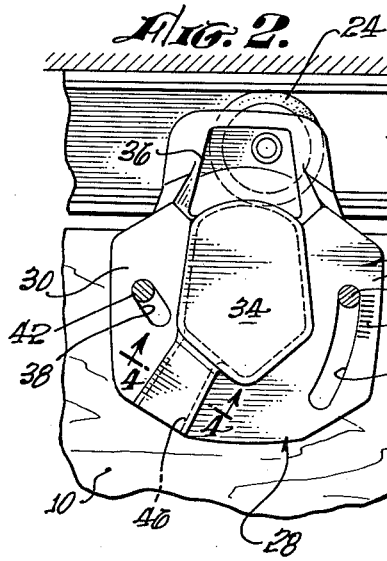
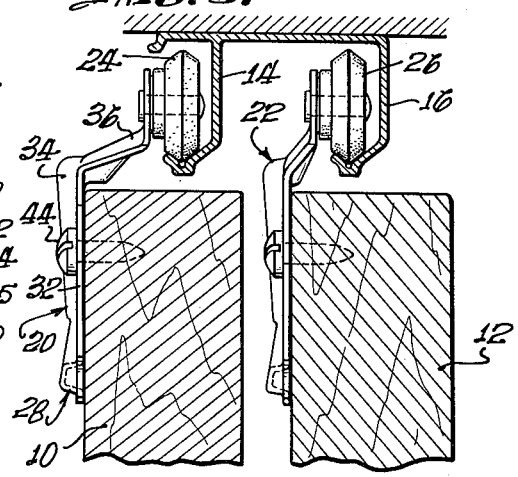
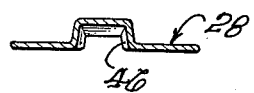
KENNETH K. KELLEMS,
INVENTOR.
BY HIS ATTORNEYS.
HARRIS, KIECH, RUSSELL & KERN.

United States Patent Office 3,159,866
Patented Dec. 8, 1964

3,159,866
VERTICALLY ADJUSTABLE SLIDING DOOR HANGER
Kenneth K. Kellems, Ontario, Calif., assignor to Acme Appliance Manufacturing Company, Monrovia, Calif., a corporation of California
Filed May 31, 1962, Ser. No. 198,902
2 Claims. (Cl. 16—105)

The present invention relates in general to means for adjusting, in a predetermined direction, the relative positions of an element and a member connected thereto.

Since the invention is particularly applicable to and was originally embodied in a hanger which is vertically adjustable relative to a sliding door, it will be considered in such connection herein for convenience of disclosure.

A primary object of the invention is to provide a very simple and compact means of vertically adjusting a sliding door hanger, and one which requires no special tools.

More particularly, an important object of the invention is to provide a vertically adjustable sliding door hanger comprising: a hanger bracket seatable against a sliding door surface, preferably the rear surface of a sliding door; two vertically convergent screw slots formed in the hanger bracket and adapted to receive mounting screws extending therethrough into the door; means on the hanger bracket engageable by suitable tool or tool means for pivoting or rocking the bracket relative to the screws so as to vertically adjust the position of the sliding door relative to the bracket; and a wheel mounted on the hanger bracket for rotation about an axis perpendicular thereto and engageable with a track for supporting the sliding door.

With the foregoing construction, the sliding door, which is equipped with at least two of the adjustable hangers of the invention, may be leveled very readily merely by loosening slightly the screws extending through at least one of the hanger brackets, pivoting such hanger bracket relative to the screws by means of a suitable tool, and retightening the screws. The screws, when loosened slightly for adjustment purposes, bind in the vertically convergent screw slots so that the hanger bracket remains in the position into which it is pivoted while the screws are retightened, which is an important feature of the invention.

A further object is to provide tool engageable means on the hanger bracket which comprises a socket oriented generally parallel to the plane of the screw slots and adapted to receive a tool such as a screwdriver therein. Thus, the same screwdriver used to loosen and retighten the screws may also be used to pivot the hanger bracket relative to the screws after they have been loosened slightly, which is an important feature of the invention.

Another object of the invention is to provide two downwardly convergent screw slots one of which is a relatively short, straight slot angled downwardly toward the second, the latter being a relatively long, arcuate slot the concave side of which faces toward the straight slot. A related object is to locate the center of the arc formed by the arcuate slot adjacent the upper end of the straight slot.

To increase the tendency of the screws to bind in the screw slots, and thus hold the sliding door and the bracket in the relative positions in which they are placed, the hanger bracket is knurled, or otherwise roughened, adjacent one edge of the arcuate slot, which is another object of the invention.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawing, wherein:

FIG. 1 is a fragmentary rear elevational view of the upper portions of bypassing front and rear sliding doors which are suspended from overhead tracks by vertically adjustable sliding door hangers that embody the invention;

FIG. 2 is an enlarged rear elevational view of the rear-door hanger shown in FIG. 1, the front-door hanger being substantially identical thereto;

FIG. 3 is an enlarged, fragmentary, vertical sectional view showing the rear-door and front-door hangers of FIG. 1 in edge or side elevation;

FIG. 4 is a fragmentary sectional view taken along the arrowed line 4—4 of FIG. 2; and FIG. 5 is an enlarged, perspective view of the rear-door hanger of FIG. 1 of the drawing.

In the drawing, the numerals 10 and 12 respectively designate rear and front doors of a typical bypassing sliding door installation. The rear and front doors 10 and 12 are suspended from rear and front overhead tracks 14 and 16, respectively, by rear and front hangers 20 and 22, respectively. The drawing shows only one rear hanger 20 and one front hanger 22, but it will be understood that each door will normally be suspended by at least two hangers.

The rear and front hangers 20 and 22 are provided with forwardly offset rollers or wheels 24 and 26, respectively, rotatable about horizontal axes and disposed in the rear and front tracks 14 and 16, respectively. The hangers 20 and 22 differ only in the extents to which the wheels 24 and 26 thereof are forwardly offset, it being understood that various offsets, or combinations of offsets, may be used, depending on the door thicknesses, the track spacings, and the like. Otherwise, the hangers 20 and 22 are identical and, consequently, only the rear hanger 20 will be considered further herein.

The hanger 20 comprises a hanger bracket 28 having coplanar, flat portions 30 and 32 seated against the rear surface of the door 10 adjacent the top of the door. The bracket 28 is provided with a rearwardly-deformed stiffening portion 34 intermediate the flat portions 30 and 32, and terminates at its upper end in an upwardly and forwardly extending, forwardly offset portion 36 on which the wheel 24 is rotatably mounted.

The flat portions 30 and 32 are respectively provided therein with vertically, preferably downwardly, convergent screw slots 38 and 40 having semicircular ends. The screw slot 38 is relatively short and straight and slopes downwardly from its upper end toward the screw slot 40 at an angle of the order of about 35° from the vertical. The screw slot 40, on the other hand, is relatively long and arcuate with its concave side facing toward the slot 38, the center of the arc formed by the arcuate slot 40 coinciding with the center of the semicircular upper end of the slot 38.

The hanger 20 is adapted to be secured to the door 10 by screws 42 and 44 respectively extending through the slots 38 and 40 and threaded into, or otherwise secured to, the door. As will be discussed in more detail hereinafter, the screws 42 and 44 bind in the slots 38 and 40 to frictionally maintain the hanger bracket 28 in any position into which it is pivoted or rocked relative to the door 10, within the range of pivotal or rocking movement permitted by the length of the screw slots 38 and 40. To increase this tendency of the hanger bracket 28 to bind relative to the screws 42 and 44, the hanger bracket is preferably roughened, as by knurling or serrating it as indicated at 45, along at least a portion of one edge of the arcuate screw slot 40, preferably along at least a portion of the convex side thereof.

In order to permit pivoting or rocking of the hanger bracket 28 relative to the screws 42 and 44, it is provided with a socket 46 which extends generally radially of the bracket and which is oriented generally parallel to the plane of the slotted portions 30 and 32 of the bracket. The socket 46 is adapted to receive any suitable tool for pivoting or rocking the hanger bracket 28, such as the blade 48 of an ordinary screwdriver 50.

*Operation*

The operation of the invention will, for convenience, be considered only in connection with the one rear hanger 20 shown and the description will be limited to the manner in which the rear door 10 may be leveled therewith.

Initially, the hanger 20 is installed on the door 10 with the hanger bracket 28 and the screws 42 and 44 so positioned that the screws are in the upper ends of the slots 38 and 40, respectively, and with the screws fully tightened.

The door 10 is then hung from the track 14 and it will be assumed for convenience that the corresponding portion of the door is too high and must be lowered to level the door, i.e., to render its vertical edges parallel to a jamb associated therewith.

In order to level the door 10 under the foregoing conditions, the screws 42 and 44 are loosened slightly. The blade 48 of the screwdriver 50, which may be the same screwdriver as that used to loosen the screws 42 and 44, is then inserted into the socket 46, as shown in FIG. 1 of the drawing. Thescrewdriver 50 is then swung in the counterclockwise direction to pivot or rock the hanger bracket 28 relative to the door 10, about the screw 42 as a center, in the same direction. This has the effect of permitting movement of the screw 44 downwardly in the slot 40 to lower the corresponding portion of the door 10.

The foregoing pivoting or rocking of the hanger bracket 28 is continued until the corresponding portion of the door 10 has been lowered sufficiently to level the door. This adjusted position of the door 10 relative to the hanger bracket 28 will be maintained automatically by binding of the screws 42 and 44 in the respective screw slots 38 and 40, it being unnecessary to provide any auxiliary means for preventing relative movement of the door 10 and the hanger bracket 28 while the screws 42 and 44 are retightened to permanently secure the door and the hanger bracket in their adjusted relative positions. This is an important feature of the invention since it makes leveling the door 10 a very simple matter.

Considering more specifically the manner in which the screws 42 and 44 bind in the respective screw slots 38 and 40, and assuming that these screws have been loosened, the weight of the door tends to cause the screws 42 and 44 to move downwardly in the respective screw slots 38 and 40. However, as the screw 42 moves downwardly in the screw slot 38, the lower edge of this screw slot acts as an inclined plane which produces relative movement of the door 10 and the hanger bracket 28 in a generally horizontal direction. More particularly, the hanger bracket 28 tends to move toward the left, relative to the door 10, as viewed in FIG. 2 of the drawing. Such generally horizontal relative movement of the door 10 and the hanger bracket 28 results in forcing the screw 44 tightly against the outer or concave edge of the arcuate screw slot 40 so as to frictionally lock the screw 44 and the hanger bracket 28 together. This binding action of the screws 42 and 44 in the respective screw slots 38 and 40 occurs with only a very small downward movement of the screw 42 in the screw slot 38, thereby effectively maintaining the adjusted position of the hanger bracket 28.

It will be understood that if the particular portion of the door 10 on which the hanger 20 is mounted does not need to be lowered for levelling purposes, but that the portion of the door on which the other, identical hanger (not shown) is mounted does need to be lowered to level the door, the same procedure is used in connection with such other hanger. In other words, leveling is accomplished by lowering the proper portion of the door 10 through adjustment of the corresponding one of the two hangers of the invention which support the door.

It will thus be apparent that the present invention provides a very simple and compact adjustment procedure for leveling sliding doors. All that is necessary are a slight loosening of the screws associated with the portion of the door that requires lowering, pivoting or rocking of the corresponding hanger bracket through the angle necessary to level the door, utilizing a common tool such as a screwdriver, and retightening the screws. Since the screws bind in their slots to prevent further relative movement of the hanger bracket and the door, it is unnecessary to provide any auxiliary means for maintaining the desired relative positions of the hanger and the door while retightening the screws.

Although an exemplary embodiment of the invention has been disclosed herein for purposes of illustration, it will be understood that various changes, modifications and substitutions may be incorporated in such embodiment without departing from the spirit of the invention as defined by the claims which follow:

1. In a vertically adjustable hanger for a sliding door, the combination of:
   (a) a bracket having a plane surface seatable against one side of the door;
   (b) a wheel mounted on said bracket for rotation about an axis perpendicular to the plane of said surface of said bracket;
   (c) said bracket being provided therein with two screw slots converging downwardly from upper ends of said slots to lower ends thereof;
   (d) said screw slots respectively being adapted to receive screws extending therethrough and secured to the door;
   (e) one of said screw slots being a relatively short slot sloping downwardly toward the other of said screw slots;
   (f) said other screw slot being a relatively long, arcuate slot which slopes downwardly toward a downward projection of said one screw slot and the concave side of which faces said one screw slot;
   (g) the center of curvature of said other screw slot being within said one screw slot adjacent the upper end thereof; and
   (h) the weight of the door causing a screw extending through said one screw slot to tend to move downwardly along the lower edge of said one screw slot to produce relative lateral movement between said hanger bracket and the door to force a screw extending through said other screw slot against the concave edge of said other screw slot and thereby cause the screws to wedge between the outer edges of said screw slots to hold the door in an adjusted position; and 2. In a vertically adjustable hanger for a sliding door, the combination of:
   (a) a bracket having a plane surface seatable against one side of the door;
   (b) a wheel mounted on said bracket for rotataion about an axis perpendicular to the plane of said surface of said bracket;
   (c) said bracket being provided therein with two screw slots converging downwardly from upper ends of said slots to lower ends thereof;
   (d) said screw slots respectively being adapted to receive screws extending therethrough and secured to the door;
   (e) one of said screw slots being a relatively short slot sloping downwardly toward the other of said screw slots;

(f) said other screw slot being a relatively long, arcuate slot which slopes downwardly toward a downward projection of said one screw slot and the concave side of which faces said one screw slot;

(g) the center of curvature of said other screw slot being within said one screw slot adjacent the upper end thereof;

(h) the weight of the door causing a screw extending through said one screw slot to tend to move downwardly along the lower edge of said one screw slot to produce relative lateral movement between said hanger bracket and the door to force a screw extending through said other screw slot against the concave edge of said other screw slot and thereby cause the screws to wedge between the outer edges of said screw slots to hold the door in an adjusted position; and (i) said bracket being provided with means engageable by tool means for pivoting said bracket relative to a screw extending through said one screw slot at the upper end thereof.

References Cited in the file of this patent

UNITED STATES PATENTS

| | | |
|---|---|---|
| 865,046 | Kail | Sept. 3, 1907 |
| 899,051 | Hunt | Sept. 22, 1908 |
| 2,079,028 | Nemec | May 4, 1937 |
| 2,198,089 | Peckham | Apr. 23, 1940 |
| 2,627,633 | Shectman | Feb. 10, 1953 |
| 2,746,080 | Pearson | May 22, 1956 |
| 2,775,782 | Boiu | Jan. 1, 1957 |
| 3,048,882 | Tucker et al. | Aug. 14, 1962 |

FOREIGN PATENTS

| | | |
|---|---|---|
| 547,928 | Canada | Oct. 22, 1957 |